(12) United States Patent
Gobert

(10) Patent No.: US 8,666,193 B2
(45) Date of Patent: Mar. 4, 2014

(54) GEOMETRIC METHOD OF TRANSFORMING A TWO-DIMENSIONAL IMAGE

(75) Inventor: Jean Gobert, Alfortville (FR)

(73) Assignee: ST-Ericsson (France) SAS, Grenoble (FR)

( * ) Notice: Subject to any disclaimer, the term of this patent is extended or adjusted under 35 U.S.C. 154(b) by 66 days.

(21) Appl. No.: 13/266,342

(22) PCT Filed: Apr. 27, 2010

(86) PCT No.: PCT/EP2010/055589
§ 371 (c)(1),
(2), (4) Date: Jan. 24, 2012

(87) PCT Pub. No.: WO2010/125041
PCT Pub. Date: Nov. 4, 2010

(65) Prior Publication Data
US 2012/0134587 A1    May 31, 2012

(30) Foreign Application Priority Data
Apr. 27, 2009    (FR) ..................................... 09 52754

(51) Int. Cl.
*G06K 9/36*    (2006.01)
(52) U.S. Cl.
USPC ............ 382/276; 382/173; 382/284; 382/308
(58) Field of Classification Search
USPC .......... 382/173, 276, 284, 308; 324/307, 309; 345/543, 582; 348/36, 335; 359/385, 359/577; 356/521
See application file for complete search history.

(56) References Cited

U.S. PATENT DOCUMENTS 6,459,451 B2 * 10/2002 Driscoll et al. ............... 348/335
6,473,536 B1 * 10/2002 Chiba et al. ................... 382/284
2002/0122113 A1    9/2002 Foote

FOREIGN PATENT DOCUMENTS

| EP | 1357516 A2 | 10/2003 |
| EP | 1598778 A1 | 11/2005 |
| WO | 2006031214 A1 | 3/2006 |

OTHER PUBLICATIONS

Wolberg, G., "Digital Image Warping Passage", Spatial Transformations, Jan. 1, 1990, Digital Image Warping, (pp. 41-94, 117 XP002451703, pp. 44-45, paragraph 3.1.2, p. 53, paragraph 3.4.2-p. 61, paragraph 3.5.4.
Zelnik-Manor, L. et al., "Squaring the Circles in Panoramas", Computer Vision, 2005 ICCV 2005, Tenth IEEE International Conference on Beijing, China, Oct. 17-20, 2005, vol. 2, Oct. 17, 2005 (pp. 1292-1299, XP010856965, Piscataway, NJ, USA IEEE ISBN: 978-0-7695-2334-7 *abstract page 1292, paragraph 1-p. 1296, paragraph 3.1.

(Continued)

*Primary Examiner* — Anh Do
(74) *Attorney, Agent, or Firm* — Coats & Bennett, P.L.L.C.

(57) ABSTRACT

Geometric method of transforming a first two-dimensional image into a second two-dimensional image through an image processing applied to the first images or to the second image. In this method, one of said first and second images is divided into several surfaces, each of the surfaces of the divided image is transformed by a bilinear transformation specific to each surface, and the transformed surfaces are grouped together.

18 Claims, 5 Drawing Sheets

(56) References Cited

OTHER PUBLICATIONS

Eric Weisstein, "Gnomonic Projection" Mathworld, (online), Oct. 27, 2007, XP002558251 Retrieved from the Internet: URL.http://mathworld.wolfram.com/GnomonicP (retrieved on Dec. 11, 2009) the whole document.

Qiang Yu. Rapid location and non-linear distortion correction technology for graphical barcode encoding of speech. Chinese Mater's Theses Full-text Database (CMFD), Information Technology Series, No. 3, 2009 I138-818; Mar. 15, 2009.

Office Action from the State Intellectual Property Office of China (issued Oct. 24, 2013) in re Application No. 201080018830.7 and Issue Serial No. 2013102100951830.

* cited by examiner

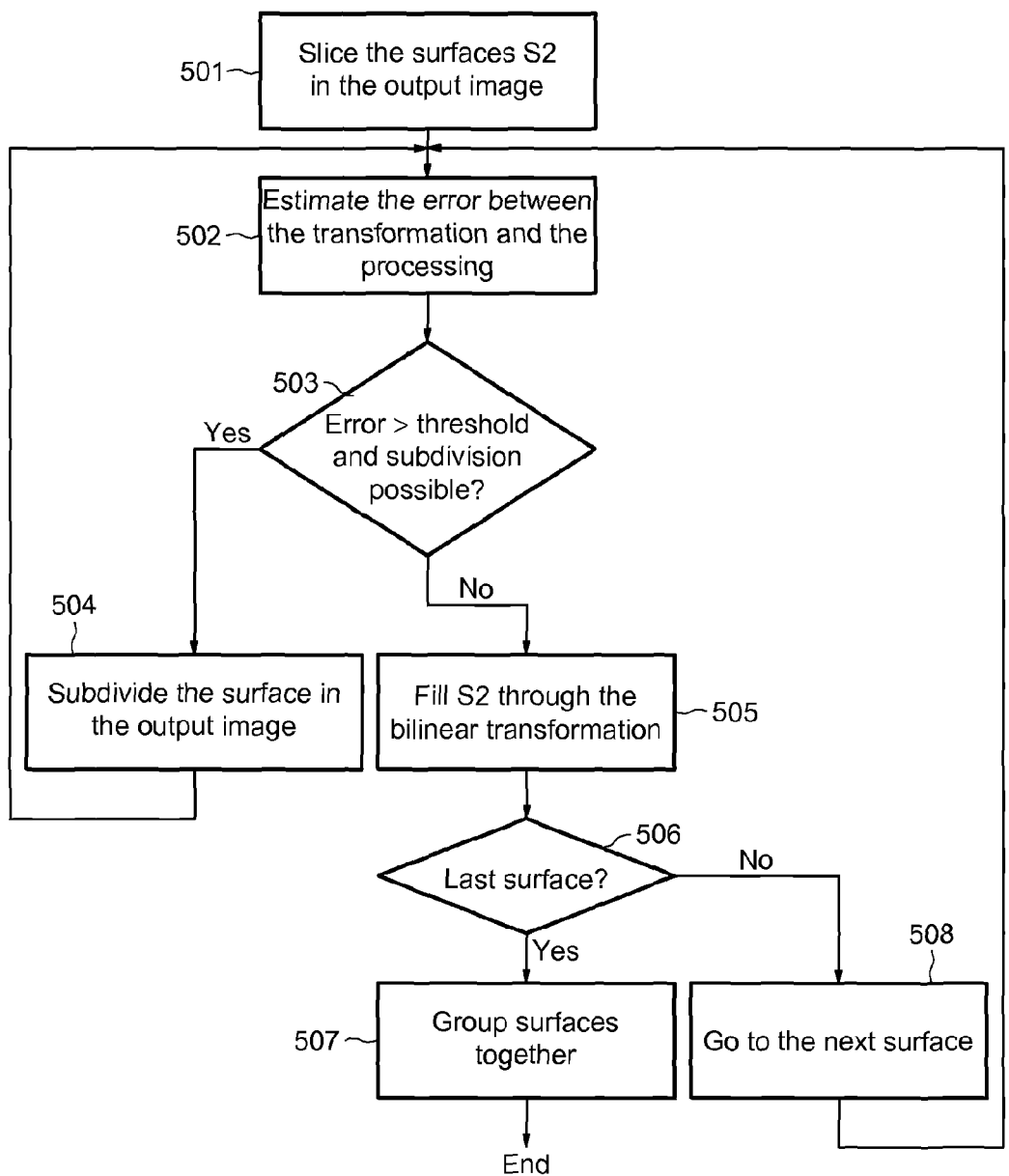

GEOMETRIC METHOD OF TRANSFORMING A TWO-DIMENSIONAL IMAGE

TECHNICAL FIELD

The present invention relates, generally, to image processing. It applies advantageously, but not limitingly, to any electronic device implementing a complex transformation on a two-dimensional image.

BACKGROUND

Signal processing and, in particular, image processing require numerous computational resources. Such processing can also take a great deal of time. Such is the case with image processing such as for example perspective transformation or inversion of an equirectangular and gnomonic transformation.

SUMMARY

The objective particularly sought is to replace this processing with a transformation that consumes fewer computational resources so as to obtain a processing whose transformation is simple and whose result is close to that of this processing.

According to one aspect, there is proposed a geometric method of transforming a first two-dimensional image into a second two-dimensional image through an image processing applied to the first image or to the second image.

According to this aspect, such an objective is achieved by dividing one of said first and second images into several surfaces and then, each of the surfaces of the divided image is transformed by a bilinear transformation specific to each surface, and the transformed surfaces are grouped together.

An approximation of the transformed image by the processing is thus obtained. Furthermore, on account of the use of the bilinear transformation, a simple transformation is thus obtained, which does not consume many resources. Such a transformation is also accurate, since it is fairly faithful and does not exhibit a large error with the image after processing. The accuracy is all the larger the smaller the divided surfaces.

According to one alternative, a bilinear transformation is chosen for each surface so that the result of this transformation applied to a part of the vertices of the surface corresponds to the result of said processing applied to said part of said vertices.

According to another alternative, the processing is applied to the second image and is a processing inverse to the processing when it is applied to the first image.

According to one mode of implementation there is proposed a method comprising the steps of:
  slicing the transformed image into quadrilateral surfaces (S2); and
  on each of these sliced surfaces (S2):
    determining, through said inverse processing on each of the four vertices (xi,yi,i=0 . . . 3) of the surface (S2), four points (ui,vi,i=0 . . . 3) in the image to be transformed filling the surface through a bilinear transformation which associates said four vertices (xi,yi,i=0 . . . 3) of the sliced surface (S2) with said four points (ui,vi,i=0 . . . 3).

According to another mode of implementation, said bilinear transformation on the surface (S2) allows its filling by a surface (S1) delimited by said four points (ui,vi,i=0 . . . 3) and, according to this mode of implementation, said sliced surfaces (S2) are grouped together after they are filled.

According to yet another mode of implementation, the processing is a perspective transformation.

According to an additional mode of implementation, the processing is composed of an inverse equirectangular transformation and of a gnomonic transformation.

According to another additional mode of implementation, the method comprises, before the grouping step and for each of the sliced quadrilateral surfaces (S2), a step of determining the error between the sliced surface (S2) after filling and the surface arising from said processing on the whole of the surface (S1) and if this error is greater than a given threshold then the sliced surface (S2) is subdivided.

Thus, in the case where the error is too large, then the dimension of the quadrilateral surface on which the processing must be carried out is reduced. This affords an adaptive processing as a function of the complexity of each of the parts of the image.

According to yet another additional mode of implementation, the error determination step comprises the steps of:
  determining a first point in S1 associated with the centre of the surface S2 through said bilinear transformation;
  determining a second point in S1 associated with the centre of the surface S2 through said inverse processing;
  computing the distance between these two points.

According to a last mode of implementation, the filling of each of the sliced surfaces (S2) through the bilinear transformation is carried out in geometric form and comprises the following steps:
  determining, by using the properties of conservation of the barycentres of a bilinear transformation, the lines (lk) in the surface (S1) which result from said bilinear transformation applied to lines of pixels (Lk) in the quadrilateral (S2);
  determining, by using the properties of conservation of the barycentres of a bilinear transformation, the points (p1) in the surface (S1) which result from said bilinear transformation applied to pixels (P1) in the quadrilateral (S2);
  filling the pixels (P1) with the values of said points (p1).

BRIEF DESCRIPTION OF THE DRAWINGS

Other advantages and characteristics of the invention will be apparent on studying the detailed description of modes of implementation and embodiments, taken by way of nonlimiting examples and illustrated by the appended drawings in which:

FIG. 5 illustrates the steps of the whole of the simplified processing method.

DETAILED DESCRIPTION

Figure 1:
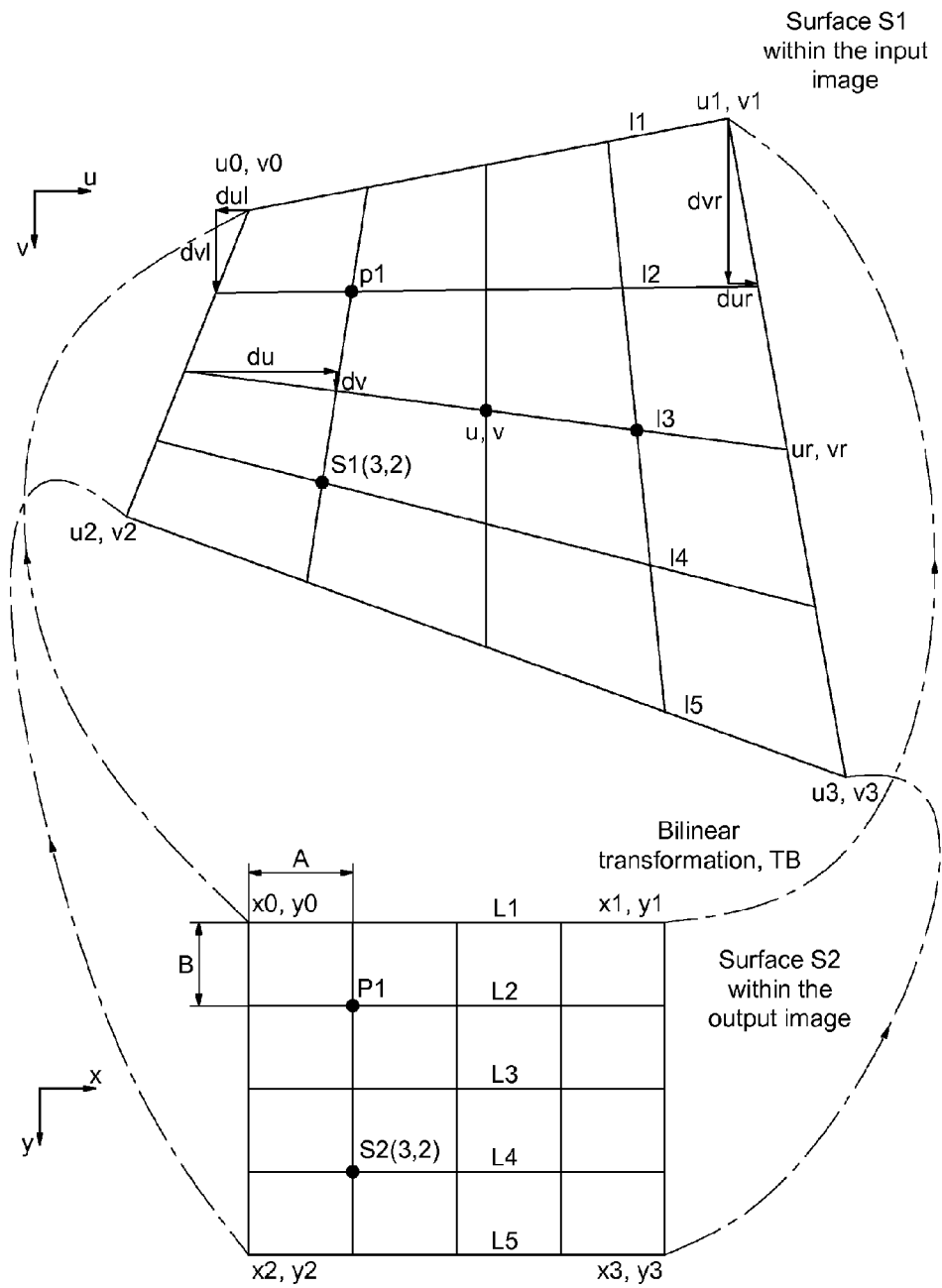
FIG. 1 represents the input surface and the output surface illustrating the implementation of the method in the case where the processing to be simplified is a perspective transformation.

In FIG. 1 is illustrated the transformation making it possible to implement in a simplified manner a perspective transformation processing. The input image corresponds to the image to be transformed by the method. The output image corresponds to the image after transformation by the method. The transformations and processings to which reference will be made hereinafter can equally well be applied directly to the input image or inversely to the output image. Preferably, inverse processing on the output image is used. Indeed, if the direct transformation is used and the output image is generated by successively scanning all the pixels of the input image, it is possible that pixels of the output image may not be visited, thereby creating holes. Whereas by using the indirect transform, all the pixels of the output image are visited. It is therefore to this processing that reference is made hereinafter.

Initially, the output image can be sliced up into several rectangles or quadrilateral surfaces comprising an integer number of pixels (for example $2^m$ or 2 to the power m along the y axis and $2^n$ or 2 to the power n along the x axis). An example of these rectangles (n=2, m=2) is illustrated at the bottom of FIG. 1. The rectangle such as illustrated is itself divided into several quadrangles whose dimensions A and B correspond to that of a pixel. Thus, for example, A corresponds to the length of a pixel and B corresponds to the width of a pixel on the arrival image. With each of the intersection points of the two lines is in fact associated a pixel; the latter can be situated on the intersection point or inside the quadrangle whose top left point is the intersection point.

An inverse perspective transformation function is then used on the quadrilateral of the output image. The four vertices xi, yi of the quadrilateral are then associated with four points ui, vi in the input image. Accordingly, we start from an output pixel and determine the point which must be associated with it.

For the perspective transformation and the determination of the pixel of the input image (ui, vi) to be associated with a pixel of the output image (xi, yi), the following formulae are used here:

$$NXi = a \cdot xi + b \cdot yi + c$$

$$NYi = d \cdot xi + e \cdot yi + f$$

$$D = g \cdot xi + h \cdot yi + j$$

$$R = 1/D$$

$$ui = NXi \cdot R$$

$$vi = NYi \cdot R$$

The values a, b, c, d, e, f, h, j are constants which depend on the perspective transformation. By virtue of these formulae it is possible to determine, for each of the pixels of the output image, the point in the input image which must be associated with it in order to carry out the perspective transformation.

This transformation is carried out on the vertices xi, yi (i varying from 1 to 4) of a surface S2 sliced in the output image. It allows, through the association of the four vertices (x0, y0) (x1, y1) (x2, y2) (x3, y3) with four points (u0, v0) (u1, v1) (u2, v2) (u3, v3), the choice of a bilinear transformation TB.

The latter is chosen and defined such that the four vertices (x0, y0) (x1, y1) (x2, y2) (x3, y3) of said sliced surface S2 after their transformation by TB correspond respectively to the four points (u0, v0) (u1, v1) (u2, v2) (u3, v3). Carrying out this bilinear transformation TB on the sliced surface S2 thus allows the filling thereof by a surface S1 delimited by the four points (u0, v0) (u1, v1) (u2, v2) (u3, v3). An approximation of the perspective transformation with a specific bilinear transformation is thus carried out.

The bilinear transformation TB can for example be carried out in a geometric manner, by using the properties of a bilinear transformation. Indeed, the bilinear transform of a barycentre of two points is equal to the barycentre of the bilinear transforms of each of the points. By way of example, in the sliced surface S2, the position of the bilinear transform of the midpoint of (x0,y0) and (x2,y2) is the midpoint of (u0,v0) and (u2,v2) of the surface S1. It is this property which is used hereinafter.

The list of lines (lk,k=1 ... 5) in the surface S1 which are the result of the bilinear transform TB applied to the pixel lines is first of all determined. The first and the last line have as ends (u0,v0) & (u1,v1) and (u2,v2) & (u3,v3). They therefore correspond on account of the choice of the bilinear transform TB respectively to the pixel lines L1 and L5. The following lines are determined by virtue of the quantities:

$$dul = (u2-u0)/(2^m)$$

$$dvl = (v2-v0)/(2^m)$$

$$dur = (u3-u1)/(2^m)$$

$$dvr = (v3-v1)/(2^m)$$

It is apparent here that the choice of a number of pixels being expressed as a power of 2 along the x axis allows a very fast binary computation. Indeed a division of a binary number by a number such as 2 power r ($2^r$ in mathematical notation) is limited to a shift of r bits of the binary number.

By using these quantities, the ends of the kth line are two points whose coordinates are: (u0+(k−1)·dul, v0+(k−1)·dvl) and (u1+(k−1)·dur, v1+(k−1)·dvr).

The ends of the lines (Lk, k=1 ... 5) are barycentres of the points (x0,y0) & (x2,y2) and (x1,y1) & (x3,y3). The ends of their bilinear transform under TB (lk, k=1 ... 5) are therefore barycentres of the points (u0,v0) & (u2,v2) and (u1,v1) & (u3,v3) on account of the stated property of conservation of the barycentres.

By way of example the ends of L2 are the barycentre (⅓,1) of (x0,y0) and (x2,y2) and the barycentre (⅓,1) of (x1,y1) and (x3,y3). While the ends of l2 are the barycentre (⅓,1) of (u0,v0) and (u2,v2) and the barycentre (⅓,1) of (u1,v1) and (u3,v3). l2 is therefore the bilinear transform TB of L2.

Thereafter, on each of these lines, points are determined, the first being the left end of the line and the qth point is such that: (u0+(k−1)·dul+(q−1)·du, v0+(k−1)·dvl+(q−1)·dv) with k its line number and du, dv:

$$du = (u1+(k-1) \cdot dur - u0+(k-1) \cdot dul)/(2^n)$$

$$dv = (v1+(k-1) \cdot dvr - v0+(k-1) \cdot dvl)/(2^n)$$

The choice of a number of pixels along the x axis being expressed in the form 2 power n here again allows a reduction in the computation times.

Each of these points in fact lies at the intersection of two lines whose ends are barycentres of the vertices of S1. They are therefore indeed the result of the bilinear transform of the points lying at the intersection of the lines whose ends are barycentres with the same coefficients of the vertices of S2. Thus, by way of example, the point p1 corresponds to the pixel P1 under the bilinear transform TB.

A square grid, illustrated in FIG. 1, can therefore be used. To carry out the filling by the bilinear transformation TB, with each pixel of S2 number q on the kth line (Lk) S2(k,q) is associated the value of the point of S1 number q on the kth line (lk) S1(k,q) with k and q varying between 1 and 5 in the example illustrated.

An approximation is thus obtained as S2 by bilinear transformation of the perspective transformation of the surface S1. This approximation has the characteristic of not exhibiting any error at the four vertices.

Figure 2:
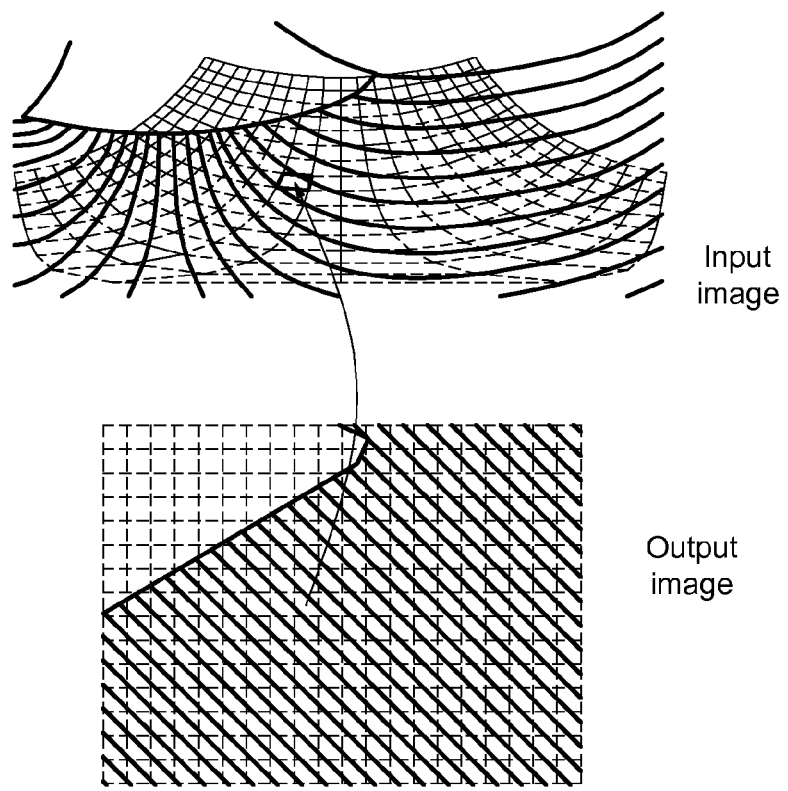
FIGS. 2 and 3 illustrate the implementation of the method in the case of another processing to be simplified.
Figure 3:
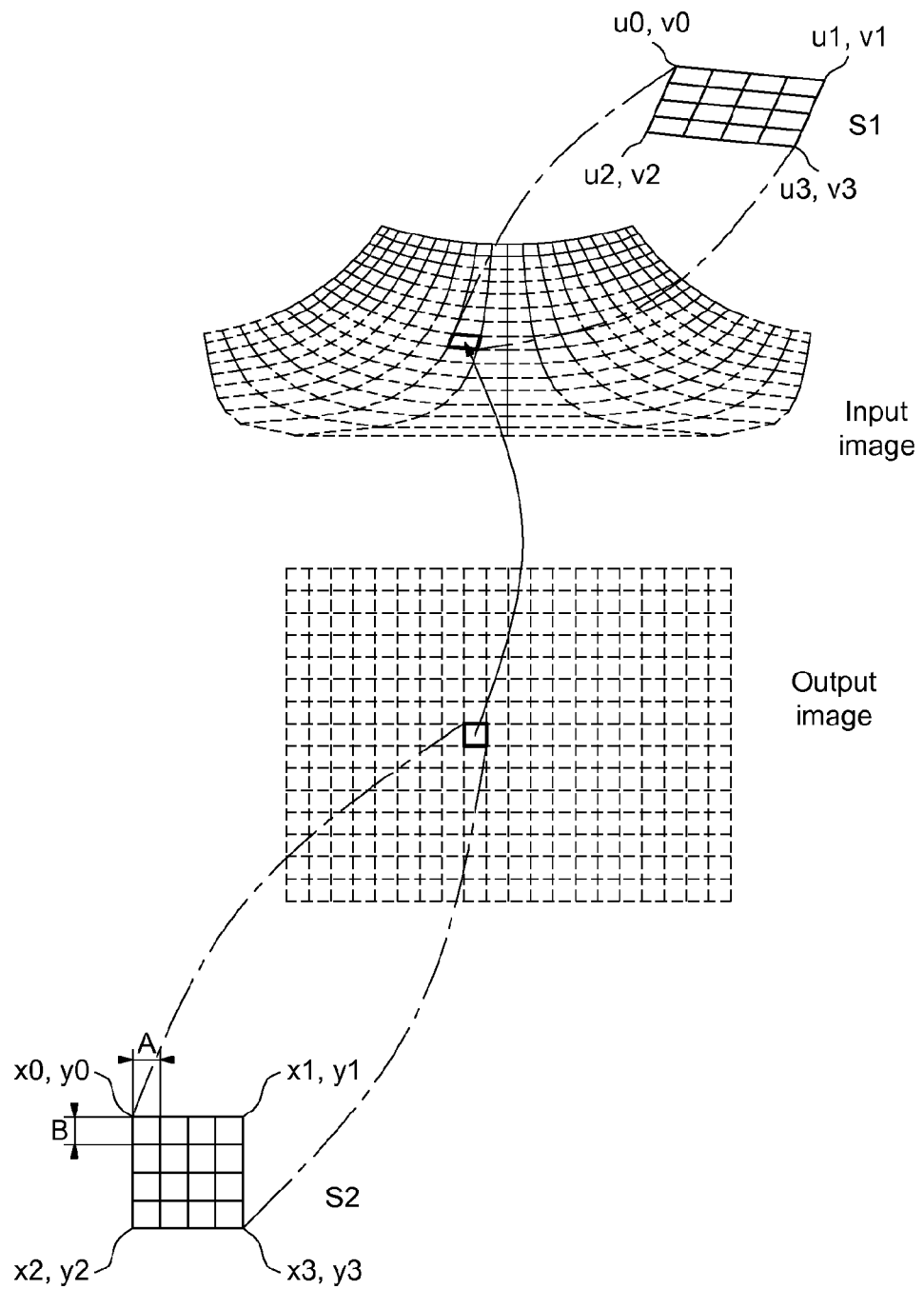

In FIGS. 2 and 3 are schematically represented the carrying out of an inverse equirectangular transformation followed by a gnomonic transformation.

The gnomonic transformation is the transformation which makes it possible to project a spherical image onto a plane tangent at a given point to this sphere. The equirectangular projection makes it possible to project a spherical image onto a plane tangent at a point at the latitude 0, that is to say "on the equator" in the well known case of a representation of the earth.

To illustrate the implementation of the method which has just been described, an image arising from an equirectangular projection in which one wishes to retrieve a detail in a direction whose latitude) (=60° is remote from the equator is used here as input image. The image on which the equirectangular projection has been carried out is in fact a sphere on which great circles lie, these great circles defining planes that are all parallel to one another. A projection without geometric deformation would make it possible to obtain oblique and parallel straight lines in the plane. But, in the case of an equirectangular projection which creates significant geometric deformations, the straight oblique lines are curves in the input image, especially around the detail. They are represented as solid lines on the image at the top of FIG. 2.

It is therefore proposed to return to the spherical representation and then to project by virtue of the gnomonic representation on a plane tangent to the detail that one wishes to clarify. An inverse equirectangular transformation followed by a gnomonic projection in the plane of the detail is therefore implemented; its latitude being situated at 60°. In FIG. 2, at the bottom, the result of the gnomonic projection is called the output image. The input image is the image on which the inverse equirectangular projection is carried out so as to return to the sphere.

The two successive projections can be carried out by using the simplified transformation based on a bilinear projection.

One will therefore proceed as in FIG. 1. As may be seen in FIG. 2, the output image is first of all sliced up into rectangles.

Then, as is illustrated in FIG. 3, a quadrilateral S1 is associated with the quadrilateral surface S2. Its four vertices (ui, vi) are determined by carrying out the transform inverse to the processing on the four vertices of the rectangle (xi, yi). In the case of a gnomonic projection the equations implemented for this purpose are:

First Series $$\rho = \sqrt{x^2 + y^2}$$
$$c = \tan^{-1}\rho$$
$$\varphi = \sin^{-1}\left(\cos c \cdot \sin\varphi_0 + \frac{y \cdot \sin c \cdot \cos\varphi_0}{\rho}\right)$$
$$\lambda = \lambda_0 + \tan^{-1}\left(\frac{x \cdot \sin c}{\rho \cdot \cos\varphi_0 \cdot \cos c - y \cdot \sin\varphi_0 \cdot \sin c}\right)$$

With x, y the coordinates relating to the point of contact on the plane tangent to the sphere at the point defined by the angles $\lambda_0$ and $\phi_0$. $\rho$ is the distance from the point in the tangent plane to the contact point. The points on the sphere are defined by $\lambda$ and $\phi$.

And in the case of an equirectangular projection:
Second Series $$u = s \cdot \lambda + u0$$
$$v = s \cdot \phi + v0$$

With u and v the coordinates on the input image.

Thus by using the first series of equations, we determine the point of the sphere which is associated with the point (xi,yi, i=0 . . . 3) in the gnomonic projection. Then with the second series of equations we determine the point (ui,vi, i= 0 . . . 3) in the equirectangular projection which is associated with this point on the sphere. The surfaces S1 and S2 are therefore defined by these two series of four points.

In the same manner as undertaken for the previous processing, the bilinear transformation associating the vertices of S2 with the vertices of S1 is then applied in such a way that the quadrilateral surface S2 is filled. This bilinear transformation can be carried out in the same manner as it was previously carried out, in a geometric manner. Thus, after determining the lines and points in the input image S1, it is possible to associate a point $S1(k,q)$ qth point of the kth line (lk) with each point $S2(k,q)$ qth point of the kth line (Lk).

The output image such as is illustrated in FIG. 2 is thus obtained, in which, in the vicinity of the detail, the various oblique lines are straight and parallel, unlike what was obtained with equirectangular projection. Therefore, in the case illustrated, the approximation is faithful enough to the gnomonic projection and the inverse of the equirectangular projection as not to create this geometric deformation.

Figure 4:
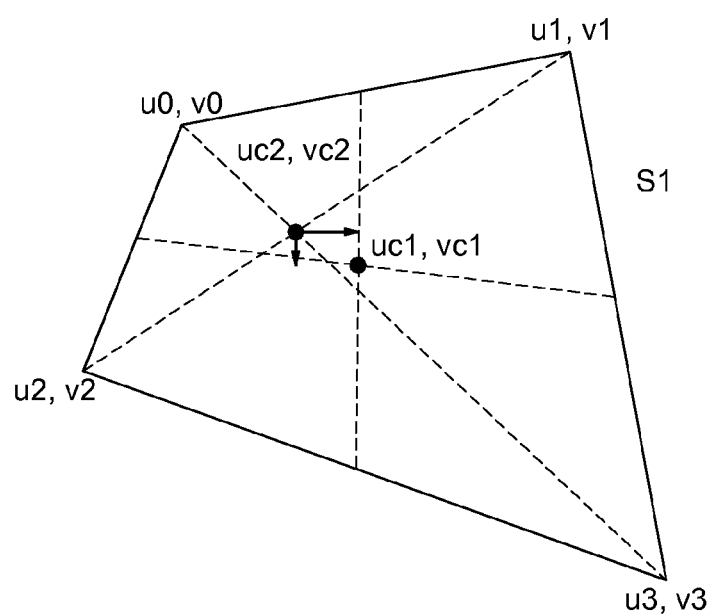
FIG. 4 illustrates the implementation of the computation of the error in the case of a perspective transformation.

In FIG. 4 is illustrated a means of determining the error during the filling of the surface S2. This error represents the difference between the result obtained with a bilinear transform to fill S2 and the result obtained with a perspective transformation processing, for example.

To estimate it, we compute the distance between two points in the surface S1 of the input image.

The first point arises from the bilinear transformation on the centre of S2 (xc,yc). Given that the transformation is bilinear, to determine its position it suffices to take the centre of the surface S1, the point with coordinates uc1, vc1 is thus deduced therefrom. To determine the surface S1, the formulae recalled below are used on the four points of the surface S2:

$$NXi = a \cdot xi + b \cdot yi + c$$
$$NYi = d \cdot xi + e \cdot yi + f$$
$$D = g \cdot xi + h \cdot yi + j$$
$$R = 1/D$$
$$ui = NXi \cdot R$$
$$vi = NYi \cdot R$$

The second point arises from the transformation inverse to the perspective transformation processing on the centre of the rectangle S2 with coordinates (xc, yc).

$$NXc = a \cdot xc + b \cdot yc + c$$
$$NYc = d \cdot xc + e \cdot yc + f$$
$$D = g \cdot xc + h \cdot yc + j$$
$$R = 1/D$$
$$uc2 = NXc \cdot R$$
$$vc2 = NYc \cdot R$$

It is for example then possible to compute the distance in the form: d=max(abs(uc2−uc1),abs(vc2−vc1))

The error being maximal at the centre, the choice of the computation of the error at the centre gives the maximum amplitude in the variation of this error, this large amplitude making it possible to discriminate all the more easily between a transformation whose error value is acceptable and a transformation whose value is unacceptable.

In FIG. 5 is illustrated the whole of the method in which the determination of the error is included. For certain zones, this determination makes it possible to reduce the surface on which the transformation is effected. This allows the accuracy of the transformation to be increased locally for surfaces in which the bilinear transformation was not satisfactory according to the error criterion. This method uses, for example, an error computation such as that illustrated by FIG. 4.

First of all the output image is sliced up into several quadrilateral surfaces S2 (501). These surfaces are preferably rectangular surfaces. This indeed makes it possible to facilitate the slicing and the carrying out of the bilinear transformation in geometric form.

Then, for an output surface S2, the error between the filling using the bilinear transformation and that which would have been carried out by the processing (502) is determined. This error expressed for example in distance form is then compared with a given threshold (503).

In the case where the error is greater than the threshold and if possible the surface undergoing processing can be subdivided (504). The method then resumes on each of these subdivisions.

Otherwise, if the error is less than the threshold or if the subdivision is impossible, then the filling of the surface S2 can be achieved using the bilinear transformation (505). Finally, it is determined whether the surface which has just been processed was the last one of the output image (506).

If this surface is indeed the last then the whole set of surfaces can be grouped together (507) and the transformation terminates.

Otherwise it is necessary to go to the next surface (508) of the output image for which the method and the step (502) are repeated.

The invention claimed is:

1. A geometric method implemented by a processing circuit of transforming images, comprising:
    dividing one of said first and second images into a plurality of surfaces;
    applying, to each surface of the divided image, a bilinear transformation specific to each surface to obtain transformed surfaces; and
    grouping the transformed surfaces together;
    wherein said bilinear transformation approximates an inverse equirectangular transformation and a gnomonic transformation.

2. The method of claim 1, further comprising choosing a bilinear transformation for each surface such that the vertices of the transformed surface are identical to vertices that an inverse equirectangular transformation and a gnomonic transformation would produce.

3. The method of claim 1 wherein:
    dividing one of the first and second images comprises slicing the second image into quadrilateral surfaces; and
    applying, to each surface of the divided image, a bilinear transformation specific to each surface to obtain transformed surfaces comprises:
        determining four points in the first image corresponding to vertices of the quadrilateral surface; and
        filling the quadrilateral surface through a bilinear transformation which associates said four vertices of the quadrilateral surface with said four points.

4. The method of claim 3, wherein
said bilinear transformation fills the quadrilateral surface using a surface on the first image delimited by said four points.

5. The method of claim 3, further comprising, before grouping the transformed surfaces together and for each of the quadrilateral surfaces:
    determining the error between the quadrilateral surface after filling and a reference surface arising from an inverse equirectangular transformation and a gnomonic transformation on the whole of the surface of the first image delimited by said four points; and
    if this error is greater than a predetermined threshold, subdividing the quadrilateral surface.

6. The method of claim 5 wherein determining the error between the quadrilateral surface after filling and the reference surface comprises:
    determining a first point in the reference surface associated with the center of the quadrilateral surface through said bilinear transformation;
    determining a second point in the reference surface associated with the center of the quadrilateral surface through an inverse equirectangular transformation and a gnomonic transformation; and
    computing the distance between the first and second points.

7. The method of claim 3 wherein filling of each of the quadrilateral surfaces through the bilinear transformation is carried out in geometric form and comprises:
    determining, by using the properties of conservation of the barycentres of a bilinear transformation, lines in the surface on the first image delimited by said four points that result from said bilinear transformation applied to lines of pixels in the quadrilateral surface;
    determining, by using the properties of conservation of the barycentres of a bilinear transformation, locations in the surface on the first image delimited by said four points that result from said bilinear transformation applied to pixels in the quadrilateral surface; and
    filling the pixels in the quadrilateral surface with the values of said locations in the surface on the first image delimited by said four points.

8. The method of claim 1 wherein:
    dividing one of said first and second images into a plurality of surfaces comprises dividing the first image into a plurality of surfaces; and
    applying, to each surface of the divided image, a bilinear transformation specific to each surface to obtain transformed surfaces comprises applying, to each surface of the first image, a bilinear transformation that maps points from the surface to a corresponding surface of the second image.

9. The method of claim 1 wherein:
    dividing one of said first and second images into a plurality of surfaces comprises dividing the second image into a plurality of surfaces; and
    applying, to each surface of the divided image, a bilinear transformation specific to each surface to obtain transformed surfaces comprises applying, to each surface of the second image, a bilinear transformation that maps points of the surface from a corresponding surface of the first image.

10. A geometric method implemented by a processing circuit of transforming images, comprising:
    dividing one of said first and second images into a plurality of surfaces;
    applying, to each surface of the divided image, a bilinear transformation specific to each surface to obtain transformed surfaces; and
    grouping the transformed surfaces together;
    wherein said bilinear transformation approximates a perspective transformation.

11. The method of claim 10, further comprising choosing a bilinear transformation for each surface such that the vertices of the transformed surface are identical to vertices that a perspective transformation would produce.

12. The method of claim 10, wherein:
dividing one of the first and second images comprises slicing the second image into quadrilateral surfaces; and
applying, to each surface of the divided image, a bilinear transformation specific to each surface to obtain transformed surfaces comprises:
  determining four points in the first image corresponding to vertices of the quadrilateral surface; and
  filling the quadrilateral surface through a bilinear transformation which associates said four vertices of the quadrilateral surface with said four points.

13. The method of claim 12, wherein
said bilinear transformation fills the quadrilateral surface using a surface on the first image delimited by said four points.

14. The method of claim 12, further comprising, before grouping the transformed surfaces together and for each of the quadrilateral surfaces:
determining the error between the quadrilateral surface after filling and a reference surface arising from a perspective transformation on the whole of the surface of the first image delimited by said four points; and
if this error is greater than a predetermined threshold, subdividing the quadrilateral surface.

15. The method of claim 14 wherein determining the error between the quadrilateral surface after filling and the reference surface comprises:
determining a first point in the reference surface associated with the center of the quadrilateral surface through said bilinear transformation;
determining a second point in the reference surface associated with the center of the quadrilateral surface through a perspective transformation; and
computing the distance between the first and second points.

16. The method of claim 12 wherein filling of each of the quadrilateral surfaces through the bilinear transformation is carried out in geometric form and comprises:
determining, by using the properties of conservation of the barycentres of a bilinear transformation, lines in the surface on the first image delimited by said four points that result from said bilinear transformation applied to lines of pixels in the quadrilateral surface;
determining, by using the properties of conservation of the barycentres of a bilinear transformation, locations in the surface on the first image delimited by said four points that result from said bilinear transformation applied to pixels in the quadrilateral surface; and
filling the pixels in the quadrilateral surface with the values of said locations in the surface on the first image delimited by said four points.

17. The method of claim 10 wherein:
dividing one of said first and second images into a plurality of surfaces comprises dividing the first image into a plurality of surfaces; and
applying, to each surface of the divided image, a bilinear transformation specific to each surface to obtain transformed surfaces comprises applying, to each surface of the first image, a bilinear transformation that maps points from the surface to a corresponding surface of the second image.

18. The method of claim 10 wherein:
dividing one of said first and second images into a plurality of surfaces comprises dividing the second image into a plurality of surfaces; and
applying, to each surface of the divided image, a bilinear transformation specific to each surface to obtain transformed surfaces comprises applying, to each surface of the second image, a bilinear transformation that maps points of the surface to a corresponding surface of the first image.

* * * * *